United States Patent
Cheng

(10) Patent No.: US 8,706,111 B2
(45) Date of Patent: Apr. 22, 2014

(54) METHOD OF PERFORMING ATTACH PROCEDURES

(75) Inventor: Tsung-Yo Cheng, New Taipei (TW)

(73) Assignee: Acer Incorporated, Xizhi Dist., New Taipei (TW)

( * ) Notice: Subject to any disclaimer, the term of this patent is extended or adjusted under 35 U.S.C. 154(b) by 0 days.

(21) Appl. No.: 13/556,228

(22) Filed: Jul. 24, 2012

(65) Prior Publication Data

US 2013/0203411 A1 Aug. 8, 2013

Related U.S. Application Data

(60) Provisional application No. 61/595,161, filed on Feb. 6, 2012.

(30) Foreign Application Priority Data

Mar. 27, 2012 (TW) .............................. 101110546 A

(51) Int. Cl.
*H04W 4/00* (2009.01)
(52) U.S. Cl.
USPC .......................... 455/435.1; 370/328; 370/421
(58) Field of Classification Search
USPC .......... 455/435.1, 436, 410, 435.2, 411, 423, 455/437, 434; 370/328, 352, 331, 401; 445/435.1, 436
See application file for complete search history.

(56) References Cited

U.S. PATENT DOCUMENTS

| 2007/0298801 | A1* | 12/2007 | Kim et al. ..................... | 455/436 |
| 2010/0279691 | A1* | 11/2010 | Dwyer et al. ................. | 455/436 |
| 2012/0135733 | A1* | 5/2012 | Cormier et al. ............ | 455/435.1 |
| 2012/0171993 | A1* | 7/2012 | Tiwari .......................... | 455/410 |
| 2013/0136115 | A1* | 5/2013 | Moisanen et al. ............ | 370/338 |

FOREIGN PATENT DOCUMENTS

EP 2 194 744 A1 6/2010

OTHER PUBLICATIONS

3rd Generation Partnership Project; Technical Specification Group Core Network and Terminals; Non-Access-Stratum (NAS) protocol for Evolved Packet System (EPS); Stage 3 (Release 10), 3GPP TS 24.301 V10.2.0 (Mar. 2011), pp. 1-315, XP050476784, France.
Ericsson et al, GCF priority 2: Adding UE pre-conditions for UE to be configured for EPS attach in 9.2.1.1.x EPS attach test cases, 3GPP TSG-RAN5 Meeting #47, R5-103810, May 10-14, 2010, cover page, pages 864-947, XP050430215, Montreal, Canada.

\* cited by examiner

*Primary Examiner* — Kiet Doan
(74) *Attorney, Agent, or Firm* — Winston Hsu; Scott Margo

(57) ABSTRACT

A user equipment is configured to perform an attach procedure by camping on a specific PLMN using a specific RAT. When receiving an attach reject due to a specific reject cause, the user equipment is configured to perform the attach procedure by camping on the specific PLMN using another RATs. When the attach procedure after RAT reselection fails, the user equipment is configured to perform the attach procedure by camping on another PLMN using one or multiple RATs.

8 Claims, 1 Drawing Sheet

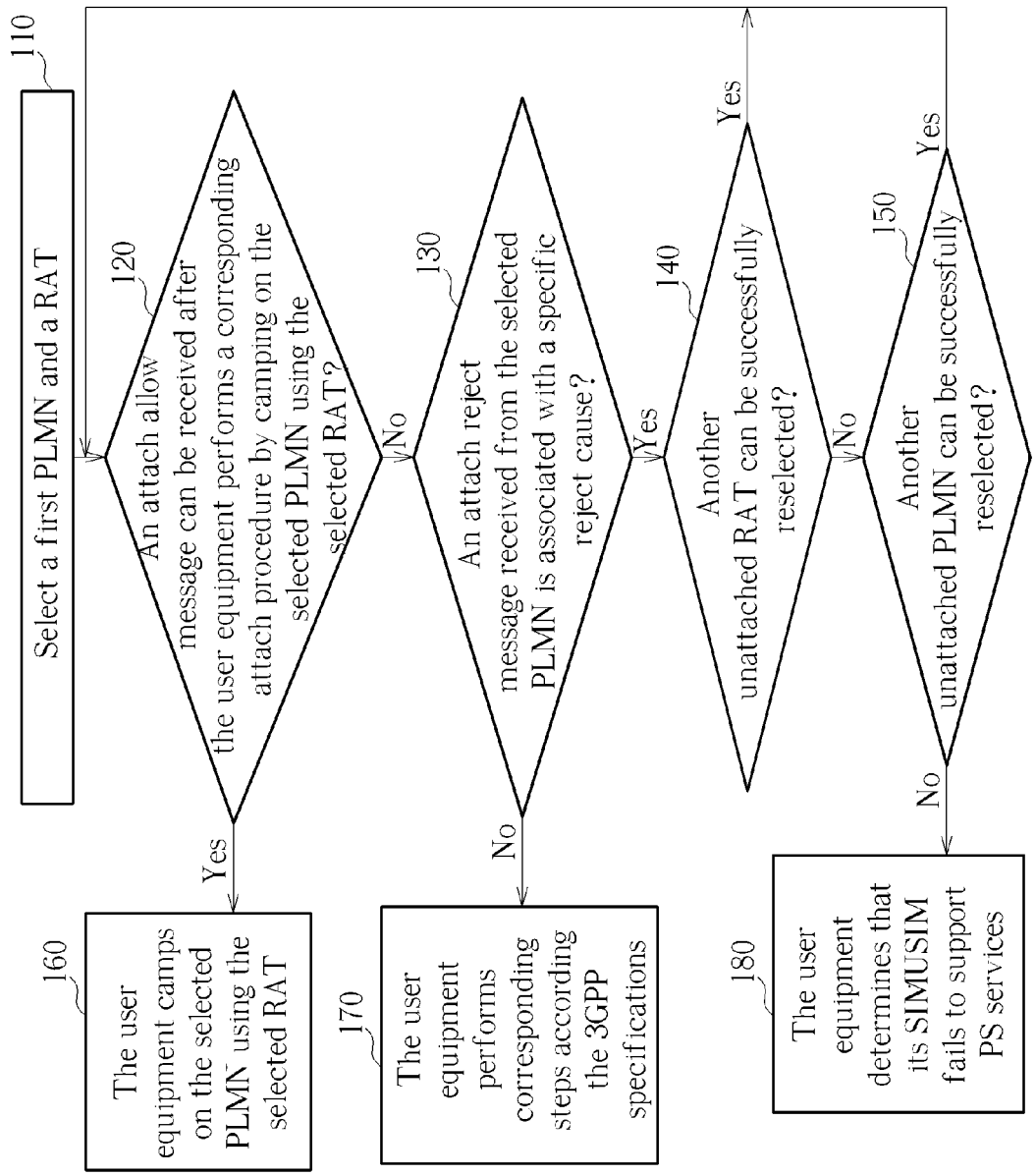

METHOD OF PERFORMING ATTACH PROCEDURES

CROSS REFERENCE TO RELATED APPLICATIONS

This application claims the benefit of U.S. Provisional Application No. 61/595,161, filed on Feb. 6, 2012, which is incorporated herein by reference.

BACKGROUND OF THE INVENTION

1. Field of the Invention

The present invention is related to a method of performing attach procedures, and more particularly, to a method of performing attach procedures by camping on one or more public land mobile networks using one or more radio access technologies.

2. Description of the Prior Art

3GPP (the 3rd Generation Partnership Project) wireless communication systems utilize WCDMA (Wideband Code Division Multiple Access) techniques and is capable of providing better performance in frequency efficiency, radio coverage, communication quality and transmission speed for multi-media applications. Also, 3GPP wireless communication systems can satisfy different QoS (Quality of Service) requirements to provide a flexible bi-directional transmission service with better communication quality and low call drop rate.

Common radio access technologies include GSM (Global System for Mobile communications), GERAN(GSM/EDEG Radio Access Network), CDMA(Code Division Multiple Access), UMTS(Universal Mobile Telecommunications System), LTE (Long Term Evolution), and E-UTRAN (Evolved Universal Terrestrial Radio Access Network) systems.

A UMTS 3GPP wireless communication system includes a user equipment (UE), a UMTS terrestrial radio access network (UTRAN) and a core network (CN). The user equipment may include a mobile equipment (ME) and a UMTS subscriber identity module (USIM), or includes a mobile equipment and a subscriber identity module (SIM). The user equipment may be connected to a Node-B of the wireless access network for communicating with a radio network controller (RNC). Via its CS (Circuit Switched) domain or PS (Packet Switched) domain depending on service type, the core network may be connected to PSTN (Public Switched Telephone Network), ISDN (Integrated Services Digital Network) or Internet for providing various voice or data services. In CS domain which evolves from GSM network, a location area (LA) including multiple cells is configured to process voice signals for providing CS services. In PS domain which evolves from GPRS (General Packet Radio Service) network, a routing area (RA) including multiple cells is configured to process data signals for providing PS services.

In the prior art, when roaming to a PLMN (Public Land Mobile Network), a user equipment may request PS services by performing an attach procedure using a first RAT (Radio Access Technology) which provides the best signal quality. However, if the PLMN can only provide PS services via a second RAT, it then sends an attach reject message to the user equipment, which thus determines that PS services cannot be supported by its USIM or SIM. In the prior art, even if the PLMN can provide PS services via the second RAT which provides worse signal quality, the attach reject message associated with the first RAT prevents the user equipment from receiving PS services.

SUMMARY OF THE INVENTION

The present invention provides a method of performing an attach procedure. The method includes a user equipment performing a first attach procedure by camping on a first PLMN using a first RAT; the user equipment performing a second attach procedure by camping on the first PLMN using a second RAT when receiving a first attach reject message associated with a first reject cause from the first PLMN; the user equipment performing a third attach procedure by camping on a second PLMN using a third RAT when receiving a second attach reject message associated with a second reject cause from the first PLMN; and the user equipment determining that a packet switch service fails to be supported when receiving a third attach reject message associated with a third reject cause from the second PLMN.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The FIGURE is a flowchart illustrating a method of performing an attach procedure according to the present invention.

DETAILED DESCRIPTION

The present invention provides a method of performing an attach procedure. When a user equipment receives an attach reject message from a PLMN, the present invention provides retry mechanisms for increasing the success rate of PS services.

The FIGURE is a flowchart illustrating a method of performing an attach procedure according to the present invention. The flowchart in the FIGURE includes the following steps:

Step 110: select a first PLMN and a RAT;

Step 120: the user equipment performs a corresponding attach procedure by camping on the selected PLMN using the selected RAT and determines if an attach allow message can be received: if yes, executed step 160; if no, execute step 130.

Step 130: the user equipment receives an attach reject message from the selected PLMN and determines if the attach reject message is associated with a specific reject cause: if yes, executed step 140; if no, execute step 170.

Step 140: determine if another unattached RAT can be successfully reselected: if yes, executed step 120; if no, execute step 150.

Step 150: determine if another unattached PLMN can be successfully reselected: if yes, executed step 120; if no, execute step 180.

Step 160: the user equipment camps on the selected PLMN using the selected RAT.

Step 170: the user equipment performs corresponding steps according the 3GPP specifications.

Step 180: the user equipment determines that its SIM/USIM fails to support PS services.

In step 110, when roaming using the USIM/SIM issued by certain service provider, the user equipment may request PS services by selecting a PLMN and a RAT. For example, if camping on a first PLMN using a first RAT provides the best signal quality, the user equipment may be configured to perform an attach procedure using the first RAT for requesting PS services. The first PLMN may be able to provide PS services via the first RAT, or may only be able to provide PS services via a second RAT.

In step 120, if the selected PLMN is able to provide PS services via the selected RAT, the user equipment may receive an attach allow message. Step 160 is then executed so that the user equipment may camp on the selected PLMN using the selected RAT, such as camping on the first PLMN using the first RAT. In step 120, if the selected PLMN is unable to provide PS services via the selected RAT, step 130 is then executed.

In step 130, if the selected PLMN is unable to provide PS service via the selected RAT, the user equipment may receive an attach reject message. If the attach reject message is associated with the specific reject cause, step 140 is executed; if the attach reject message is not associated with the specific reject cause, step 170 is executed.

In step 140, the user equipment is configured to determine if another unattached RAT can be successfully reselected. If the selected PLMN may only support single RAT or the user equipment fails to perform the attach procedure using all RATS supported by the selected PLMN, it is determined that the RAT reselection fails and step 120 is executed again. In other words, the present invention provides a RAT retry mechanism by executing steps 140, 120 and 130 in cycle.

In step 150, the user equipment is configured to determine if another unattached PLMN can be successfully reselected. If only one PLMN is available during roaming or the user equipment fails to camp on all the PLMNs in the roaming region, it is determined that the PLMN reselection fails and step 120 is executed again. In other words, the present invention provides a PLMN retry mechanism by executing steps 150, 120, 130 and 140 in cycle.

In step 160, the user equipment is configured to camp on the selected PLMN using the selected RAT. The selected RAT may be an initially selected RAT or a reselected RAT which allows the user equipment to receive the attach allow message in step 120. The selected PLMN may be an initially selected PLMN or a reselected PLMN which allows the user equipment to receive the attach allow message in step 120.

In the embodiments of the present invention, the selected PLMN may include, but not limited to, wireless network systems provided by various manufacturers, such as GSM, GERAN, CDMA, UMTS or LTE systems. The selected RAT may include, but not limited to, 2G, 2.5G, 3G, 4G or 5G. The selected PLMN may provide PS services using one or multiple RATS.

In step 120 according to the embodiments of the present invention, the user equipment may perform an attach procedure by executing corresponding steps in 3GPP specifications, such as registering IMSI (International Mobile Subscriber Identity) for requesting GPRS services or for requesting both GPRS and non-GPRS services, or registering EPC (evolved packet core) for requesting EPC services or for requesting both EPC and non-EPC services. In LTE systems, the attach procedure may be a routing area update (TAU) procedure. However, the above-mentioned embodiments do not limit the scope of the present invention.

In step 130 according to the embodiments of the present invention, the specific reject cause may be one of the reject causes defined in the 3GPP specifications. For example, the 3GPP specification TS 24.008 defines reject causes including "#7 GPRS services not allowed" and "#8 GPRS services and non-GPRS services not allowed", while the 3GPP specification TS 24.301 defines reject causes including "#7 EPS services not allowed" and "#8 EPS services and non-EPS ser-
vices not allowed". However, the above-mentioned embodiments do not limit the scope of the present invention.

In step 130 according to the embodiments of the present invention, the user equipment may receive an attach reject message associated with other reject causes, such as "#3 illegal MS", "#4 illegal ME", "#11 PLMN not allowed", "#12 location area not allowed", "#13 roaming not allowed in this location area", "#14 GPRS services not allowed in this PLMN", "#15 no suitable cells in this location area" or "#25 not authorized for this CSG" defined in the 3GPP specification TS 24.008, or "#3 illegal UE", "#4 illegal ME", "#11 PLMN not allowed", "#12 tracking area not allowed", "#13 roaming not allowed in this tracking area", "#14 EPS services not allowed in this PLMN", "#15 no suitable cells in this tracking area" or "#25 not authorized for this CSG" defined in the 3GPP specification TS 24.301. However, the above-mentioned embodiments do not limit the scope of the present invention.

In step 180, the user equipment determines that its SIM/USIM fails to support PS services only after the RAT reselection and PLMN reselection both fail.

In the present invention, when receiving an attach reject message from a specific PLMN, the user equipment is configured to perform the attach procedure by camping on the specific PLMN using other RATs. When the attach procedure still fails after RAT reselection, the user equipment is configured to perform the attach procedure by camping on another PLMN using one or multiple RATs. The user equipment is configured to determine that its SIM/USIM fails to support PS services only after the RAT reselection and PLMN reselection both fail. Therefore, the attach procedure according to the present invention may increase the success rate of PS services.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing an attach procedure, comprising:
   a user equipment performing a first attach procedure by camping on a first public land mobile network (PLMN) using a first radio access technology (RAT);
   the user equipment performing a second attach procedure by camping on the first PLMN using a second RAT when receiving a first attach reject message associated with a first reject cause from the first PLMN in response to the first attach procedure;
   the user equipment performing a third attach procedure by camping on a second PLMN using a third RAT when receiving a second attach reject message associated with a second reject cause from the first PLMN in response to the second attach procedure; and
   the user equipment determining that a packet switch (PS) service fails to be supported when receiving a third attach reject message associated with a third reject cause from the second PLMN in response to the third attach procedure.

2. The method of claim 1, further comprising:
   the user equipment camping on the first PLMN using the first RAT when receiving a first attach allow message associated with the first attach procedure from the first PLMN;

the user equipment camping on the first PLMN using the second RAT when receiving a second attach allow message associated with the second attach procedure from the first PLMN; and the user equipment camping on the second PLMN using the third RAT when receiving a third attach allow message associated with the third attach procedure from the second PLMN.

3. The method of claim 1, wherein the first to third reject causes include "#7 GPRS (General Packet Radio Service) services not allowed "or "#8 GPRS services and non-GPRS services not allowed" defined in a 3GPP (the 3rd Generation Partnership Project) specification.

4. The method of claim 1, wherein the first to third reject causes include "#7 EPS (evolved packet system)services not allowed " or "#8 EPS services and non-EPC services not allowed" defined in a 3GPP specification.

5. The method of claim 1, wherein the first to third attach procedures include:

registering an IMSI (International Mobile Subscriber Identity) for requesting a GPRS service or for requesting both GPRS and non-GPRS services; or registering an EPC (evolved packet core) for requesting an EPC service or for requesting both EPC and non-EPC services.

6. The method of claim 1, wherein the first to third attach procedures include a tracking area update (TAU) procedure or a routing area update (RAU) procedure.

7. The method of claim 1, wherein the user equipment determines that the PS service fails to be supported by a SIM (Subscriber Identity Module) or a USIM (Universal Subscriber Identity Module) when receiving the third attach reject message associated with a third reject cause from the second PLMN.

8. The method of claim 1, wherein the first to third PLMNs include a GSM (Global System for Mobile Communications) system, a GSM/EDEG Radio Access Network (GERAN) system, a CDMA (Code Division Multiple Access) system, a UMTS (Universal Mobile Telecommunications System), an LTE (Long Term Evolution) system, or an E-UTRAN (Evolved Universal Terrestrial Radio Access Network) system.

* * * * *